No. 717,394. Patented Dec. 30, 1902.
H. HALSEY.
ELECTRIC BATTERY.
(Application filed Apr. 18, 1902.)

(No Model.)

Witnesses
Robert H. Ireland
Lester C. Taylor

Henry Halsey  Inventor
By his Attorney
C. W. Edwards.

THE NORRIS PETERS CO., PHOTO-LITHO., WASHINGTON, D. C.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 717,394, dated December 30, 1902.

Application filed April 18, 1902. Serial No. 103,641. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to that class of primary batteries invented by me in which one or both elements, wholly submerged, are revolved during the operation of the battery.

The present invention is a new method or mode of controlling the output of such a battery and also maintaining the constancy of the same.

In carrying out said method I employ in a battery a movable element and means for moving said element at any desirable rate of speed or employ a stationary element and moving electrolyte, and inasmuch as the output of the battery will vary proportionately to the difference in speed between the element and the electrolyte the output of the battery may be varied by varying the speed of the element. To maintain the constancy of the output, I provide means for maintaining the surfaces of the elements clean and a suitable means for collecting such precipitates as may be formed in the battery, thereby keeping both the elements and the electrolyte clean and permitting efficient electrical action between the same.

The method will be described more in detail with reference to the accompanying drawings.

Figure 1:
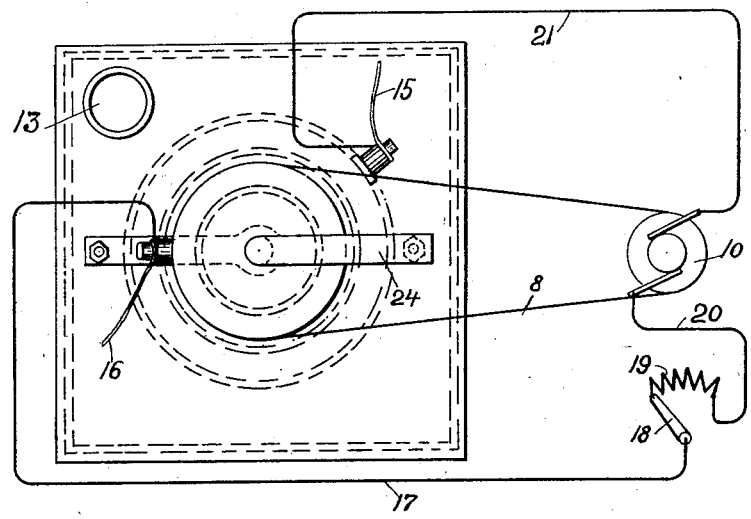
Figure 2:
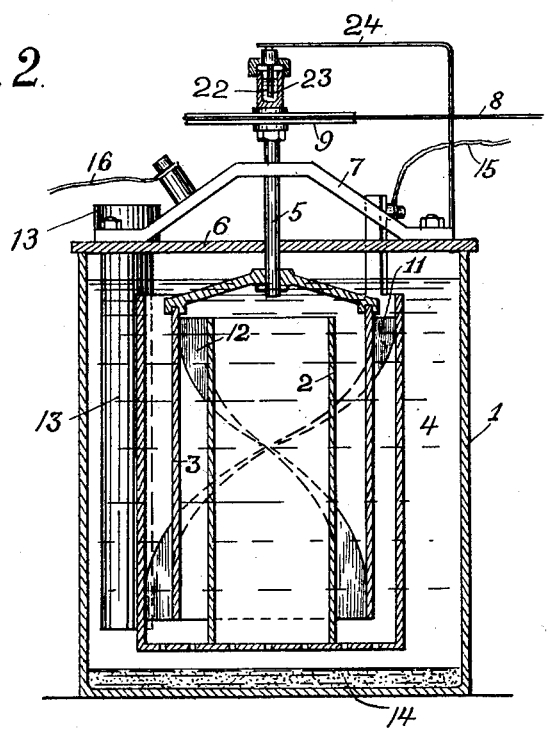

Figure 1 is a top view of a battery embodying my new method or mode of operation, and Fig. 2 is a sectional view of the battery.

In the drawings, 1 is a battery-cell, 2 and 3 are the respective elements or electrodes, and 4 is the electrolyte. Means are provided for moving one of the elements or the electrolyte whereby the elements are brushed by the electrolyte and kept clean. In the construction shown in the drawings means are provided for moving both the electrolyte and one of the elements. The movable element 3 is mounted upon a shaft 5, which is suitably mounted in the cover 6, passing through but insulated from a conducting-bridge 7, which bridge serves as a bearing for the shaft. Shaft 5 is rotated in the present instance by a band 8, passing around the pulley 9 upon shaft 5 and driven by a motor 10. The motor may be driven by any suitable power and from any source. Motor 10 is an electric motor and is driven by current from the battery. The revolving element 3 carries one or more brushes 11 12, which brush against the stationary elements 2. These brushes may be of any suitable form and arranged in any convenient manner to brush the electrodes or move the electrolyte between the electrodes. In the drawings the brushes are shown arranged upon the element in spiral form in order that as the element is revolved the brushes will not only give the electrolyte a circular movement between the elements, but also a downward movement.

A tube 13, of porous material, closed at the bottom and open at the top, is supported by the cover 6 and projects down into the electrolyte. In the tube is placed any suitable chemical depolarizing agent, such as bichromate of potassium, which will feed into the electrolyte as needed.

In the bottom of the cell is a body of pitch 14, oil of greater specific gravity than the electrolyte, or other material capable of withstanding attack from the electrolyte and of receiving and holding such solid matter in the electrolyte as may be forced into contact with it.

15 and 16 represent conductors from the electrodes of the battery, and as the motor in this instance is driven from the battery the conductor 17 leads from one electrode of the battery to the controller-handle 18, which contacts with the rheostat 19, from which conductor 20 leads to the motor 10. From motor 10 the conductor 21 leads to the battery. A simple form of connection between the movable element and the conductor 16 is that shown in which a cup containing mercury 22 is formed in the upper end of shaft 5, and a pin 23, carried by a support 24, projects into the mercury. Support 24 is of conducting material and is connected to the bridge 7, to which conductor 16 is connected.

The mode of operation of the battery above described is as follows: The initial output of the battery is always sufficient to start the motor, and thus revolve the movable element. If the element remains stationary, the output of the battery will at first be at maximum; but as polarization increases the output will proportionately decrease; but as the initial current from the battery starts the revolution of the element or electrolyte the output of the battery will remain at maximum if the speed of the element or electrolyte be also maintained at its maximum, which speed will of course in all cases be determined according to the nature of the electrolyte or elements employed, the proportions of the parts of the battery, and other working conditions.

The depolarization of the elements may be facilitated by employing a chemical depolarizing agent, such as bichromate of potassium, in the porous tube 13, which depolarizing agent feeds into the electrolyte as needed.

Such solid particles in the form of precipitates as may be formed during the action of the battery are not allowed to clog the electrolyte or permit the formation of local circuits, for the reason that such as are heavy enough to fall to the bottom of the cell are caught and absorbed by the pitch 14. They are also covered with insulating material— i. e., the pitch or oil—and are thus rendered harmless. The spiral brushes 11 12 give a downward direction to the flow of the electrolyte, and thus cause it to bear the lighter precipitates against and in contact with the pitch 14, where the precipitates are absorbed and insulated, as before described.

Having thus described my invention, I declare that what I claim as new, and desire to secure by Letters Patent, is—

1. The method of regulating the output of a battery which consists in brushing one of the elements and varying the rapidity with which said brushing is carried on.

2. The method of governing the output of a battery which consists in maintaining movement of one of its elements or the electrolyte, and freeing the electrolyte from precipitates.

3. The method of maintaining the output of a battery which consists in continuously brushing the elements of the battery and in freeing the electrolyte from precipitates.

4. The method of governing the output of a battery which consists in mechanically brushing the elements of the battery and mechanically collecting such precipitates as are formed in the electrolyte.

5. The method of maintaining the output of a battery which consists in depolarizing the elements of the battery and in mechanically freeing the electrolyte from precipitates.

6. The method of maintaining the output of a battery which consists in depolarizing the elements of the battery and establishing such circulation of the electrolyte as will bring it into contact with a collector of the precipitates.

7. The method of freeing the electrolyte from precipitates which consists in circulating the electrolyte into contact with a collector of precipitates.

8. The method of maintaining the output of a battery, which consists in insulating from the electrolyte the precipitates as they are formed.

9. The method of maintaining the output of a battery, which consists in collecting and insulating from the electrolyte the precipitates as they are formed.

In testimony whereof I affix my signature in presence of two witnesses.

HENRY HALSEY.

Witnesses:
 HENRY BEST,
 C. V. EDWARDS.